United States Patent
Hwang

(10) Patent No.: US 9,753,544 B2
(45) Date of Patent: Sep. 5, 2017

(54) KOREAN CHARACTER INPUT APPARATUS AND METHOD USING TOUCH SCREEN

(75) Inventor: Sung-Jae Hwang, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 13/993,016

(22) PCT Filed: Dec. 10, 2010

(86) PCT No.: PCT/KR2010/008846
§ 371 (c)(1),
(2), (4) Date: Jun. 10, 2013

(87) PCT Pub. No.: WO2012/077845
PCT Pub. Date: Jun. 14, 2012

(65) Prior Publication Data
US 2013/0271383 A1 Oct. 17, 2013

(51) Int. Cl.
*G06F 3/041* (2006.01)
*G06F 3/01* (2006.01)
*G06F 3/0488* (2013.01)

(52) U.S. Cl.
CPC .............. *G06F 3/017* (2013.01); *G06F 3/018* (2013.01); *G06F 3/04886* (2013.01)

(58) Field of Classification Search
USPC ................................................ 345/173–178
See application file for complete search history.

(56) References Cited

U.S. PATENT DOCUMENTS

| | | | |
|---|---|---|---|
| 2009/0066656 A1* | 3/2009 | Jung et al. | 345/171 |
| 2009/0195418 A1* | 8/2009 | Oh | 341/34 |
| 2009/0207053 A1* | 8/2009 | Lee | 341/22 |
| 2009/0262090 A1* | 10/2009 | Oh | 345/173 |
| 2009/0267901 A1* | 10/2009 | Park | 345/172 |

(Continued)

FOREIGN PATENT DOCUMENTS

| | | |
|---|---|---|
| CN | 101382869 A | 3/2009 |
| KR | 10-0159191 B1 | 8/1998 |

(Continued)

*Primary Examiner* — Sanghyuk Park
(74) *Attorney, Agent, or Firm* — Jefferson IP Law, LLP

(57) ABSTRACT

A Korean character input apparatus using a touch screen is provided. The apparatus includes an input window comprising a consonant input key, a "ㅣ" vowel input key to the right of the consonant input key, and a "ㅡ" vowel input key under the consonant input key, a character combining means by which, when one of the "ㅣ" vowel input key and the "ㅡ" vowel input key is touch-selected, a consonant corresponding to the consonant input key provided to the left of the "ㅣ" vowel input key or provided above the "ㅡ" vowel input key is selected as an initial consonant and is combined with a vowel, an output window for displaying the composed Korean character, and a controller for controlling a touch input on the input window and an output of the composed Korean character on the output window.

22 Claims, 8 Drawing Sheets

(56) References Cited

U.S. PATENT DOCUMENTS

2010/0225592 A1* 9/2010 Jo ..................... G06F 3/0236
                                                      345/171
2010/0241993 A1* 9/2010 Chae ......................... 715/830

FOREIGN PATENT DOCUMENTS

| KR | 10-1999-0052447 A | 7/1999 |
| KR | 10-1999-0065826 A | 8/1999 |
| KR | 10-2004-0016365 A | 2/2004 |
| KR | 10-2005-0025267 A | 3/2005 |
| KR | 10-0805770 B1 | 2/2008 |
| KR | 10-0821161 B1 | 4/2008 |
| KR | 10-2008-0071473 A | 8/2008 |
| KR | 10-2008-0071523 A | 8/2008 |
| KR | 10-2009-0070861 A | 7/2009 |
| KR | 10-2009-0076650 A | 7/2009 |
| KR | 10-2010-0020018 A | 2/2010 |
| KR | 10-2010-0086975 A | 8/2010 |

* cited by examiner

KOREAN CHARACTER INPUT APPARATUS AND METHOD USING TOUCH SCREEN

CROSS-REFERENCE TO RELATED APPLICATIONS

This application is a National Stage application under 35 U.S.C. §371 of an International application filed on Dec. 10, 2010 and assigned application No. PCT/KR201.0/008846, the entire disclosure of which is hereby incorporated by reference.

BACKGROUND OF THE INVENTION

1. Field of the Invention

The present invention relates to a Korean character input apparatus and method using a touch screen. More particularly, the present invention relates to an apparatus and method by which the number of character input keys disposed on a touch screen used in an electronic device, such as a cellular phone, a Portable Media Player (PMP), a Mobile Internet Device (MID), or the like, is minimized, and the input of Korean characters is simplified and sped up using a unique character input scheme.

2. Description of the Related Art

Recently, as electronic devices have been miniaturized and touch screens have risen as a core technology, a new character input scheme capable of replacing conventional input keys is demanded.

In particular, Koreans usually input Korean characters more frequently than English characters, and therefore, there is an urgent need for the development of a compact character input apparatus provided with a keypad designed to facilitate input of Korean characters.

In this regard, Korean patent publication No. 1999-65826 uses a phoneme combination scheme in which a character typing method can be learned easily, but a large number of key strokes is required due to the composition of vowels.

Also, Korean patent publication No. 1999-52447 is based on visual reinterpretation in which Korean characters have to be reconstructed by the reconstruction of consonants. In this regard, this system requires resources beyond a basic algorithm of Korean. Moreover, a large number of key strokes is required for the input of consonants, and it is not easy to learn the character typing method.

Korean patent registration No. 159191 fails to reduce the number of times required for typing keys for the input of consonants, and makes it difficult for users to understand the order of writing for the input of compound vowels.

That is, according to the Korean character input methods of the related art, an excessively large number of key strokes increases the possibility of erroneous input and requires an excessive amount of time for character input.

Therefore, a need exists for a system and method for minimizing the number of character input keys disposed on a touch screen in an electronic device, and for simplifying and speeding up the input of Korean characters on the touch screen.

SUMMARY OF THE INVENTION

Aspects of the present invention are to address at least the above-mentioned problems and/or disadvantages and to provide at least the advantages described below. Accordingly, an aspect of the present invention is to provide a Korean character input apparatus using a touch screen, by which the number of character input keys disposed on a touch screen is remarkably reduced to simplify and speed up input of Korean characters.

Another aspect of the present invention is to provide a Korean character input method using a touch screen, which uses the Korean character input apparatus using the touch screen.

Moreover, another aspect of the present invention is to provide a Korean character input system using a touch screen input means to which the Korean character input apparatus using the touch screen is applied.

In accordance with an aspect of the present invention, a Korean character input apparatus for composing and completing a Korean character according to a user touch input with respect to consonant and vowel input keys is provided. The apparatus includes an input window comprising a consonant input key, a "ㅣ" vowel input key provided to the right of the consonant input key, and a "—" vowel input key provided under the consonant input key, a character combining means by which when one of the "ㅣ" vowel input key and the "—" vowel input key of the input window is touch-selected, a consonant corresponding to the consonant input key provided to the left of the "ㅣ" vowel input key or provided above the "—" vowel input key is automatically selected as an initial consonant, and thus is combined with a vowel corresponding to the touch-input vowel input key, an output window for displaying the composed Korean character, and a controller for controlling a touch input on the input window and an output of the composed Korean character on the output window. When another consonant input key is touched and selected after the vowel input key is input, the character combining means combines a consonant corresponding to the touch-selected consonant input key with the composed Korean character as a final consonant of the Korean character. A plurality of consonant input keys are provided, each of which comprises a corresponding "ㅣ" vowel input key and "—" vowel input key, and a plurality of "ㅣ" vowel input keys and "—" vowel input keys are connected with each other to form a grid structure. A type of the vowel corresponding to the touch-input vowel input key is determined by a dragging gesture continuing from the vowel input key. In an exemplary embodiment of the present invention, the vowel corresponding to the touch-input vowel input key is determined as an input vowel if there is no dragging gesture made from the touch of the vowel input key, and if there is a dragging gesture from the touch of the vowel input key, the input vowel is determined according to a combination of the corresponding vowel and a dragging pattern. In another exemplary embodiment of the present invention, a type of the vowel corresponding to the touch-input vowel input key is determined according to a region where a user's touch of the vowel input key is stopped.

In accordance with another aspect of the present invention, if a dragging gesture made from the touch of the vowel input key extends to another vowel input key, the input vowel is determined according to a combination of the corresponding vowel, a dragging pattern, and a vowel corresponding to the another vowel input key. If a dragging gesture made from the vowel input key is recognized as a single-touch dragging gesture, it is recognized as a pure-vowel input, and, if the dragging gesture is recognized as multi-touch dragging gesture, it is recognized as a compound-vowel input. When a dragging direction is determined by the single-touch dragging gesture from the vowel input key, the dragging gesture is recognized as an input of a pure vowel "ㅏ", "ㅓ", "ㅗ", or "ㅜ", and, when the dragging direction is determined by the multi-touch dragging gesture, the dragging gesture is recognized as an input of a compound vowel "ㅑ", "ㅕ", "ㅛ", or "ㅠ".

In accordance with another aspect of the present invention a touch-screen based electronic device including the Korean character input apparatus described herein is provided.

In accordance with another aspect of the present invention, a Korean character input method based on combinations of consonants and vowels is provided. The method includes, by touch-selecting one of a "ㅣ" vowel input key provided to the right of a consonant input key and a "ㅡ" vowel input key provided under the consonant input key, automatically selecting a consonant corresponding to the consonant input key as an initial consonant of a Korean syllable, and determining an input vowel according to a dragging gesture continuing from the touch-selected vowel input key. The present invention also provides a Korean character input method based on combinations of consonants and vowels, the method including, by touch-selecting one of a "ㅣ" vowel input key provided to the right of a consonant input key and a "ㅡ" vowel input key provided under the consonant input key, automatically selecting a consonant corresponding to the consonant input key as an initial consonant of a Korean syllable, determining an input vowel according to a dragging gesture continuing from the touch-selected vowel input key, and, if another consonant input key is touch-selected after a step of determining the input vowel, recognizing a consonant corresponding to the touch-selected consonant input key as being a final consonant and combining the final consonant with a combination of the automatically selected consonant and the determined input vowel.

In accordance with another aspect of the present invention, a plurality of consonant input keys are provided, each of which comprising a "ㅣ" vowel input key provided to the right of the consonant input key and a "ㅡ" vowel input key provided under the consonant input key, wherein a plurality of "ㅣ" vowel input keys and "ㅡ" vowel input keys are connected with each other to form a grid structure.

In accordance with another aspect of the present invention, a vowel corresponding to the touch-input vowel input key is determined as an input vowel if there is no dragging gesture made from the touch of the vowel input key, and, if there is a dragging gesture from the touch of the vowel input key, the input vowel is determined according to a combination of the corresponding vowel and a dragging pattern, and, if a dragging gesture made from the touch of the vowel input key extends to another vowel input key, the input vowel is determined according to a combination of the corresponding vowel, a dragging pattern, and a vowel corresponding to the another vowel input key.

In accordance with another aspect of the present invention, if a dragging gesture made from the vowel input key is recognized as a single-touch dragging gesture, it is recognized as a pure-vowel input, and, if the dragging gesture is recognized as multi-touch dragging gesture, it is recognized as a compound-vowel input, and when a dragging direction is determined by the single-touch dragging gesture from the vowel input key, the dragging gesture is recognized as an input of a pure vowel "ㅏ", "ㅓ", "ㅗ", or "ㅜ", and, when the dragging direction is determined by the multi-touch dragging gesture, the dragging gesture is recognized as an input of a compound vowel "ㅑ", "ㅕ", "ㅛ", or "ㅠ".

An exemplary Korean character input apparatus and method according to the present invention can remarkably reduce the number of character input keys disposed on a touch screen.

Also, an exemplary Korean character input apparatus and method according to the present invention can remarkably improve the speed of input of Korean characters.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention compose and complete a Korean syllable by selecting a vowel input key, which corresponds to and is subordinate to a consonant input key corresponding to an initial consonant by a simple touch of the vowel input key, without separately touching the consonant input key. Hereinafter, exemplary embodiments of the present invention will be described with reference to the accompanying drawings. However, the exemplary embodiments may be changed into various forms and the scope of the present invention is not limited to the foregoing exemplary embodiments. That is, the exemplary embodiments of the present invention are provided to describe the present invention to those of ordinary skill in the art.

Figure 1:
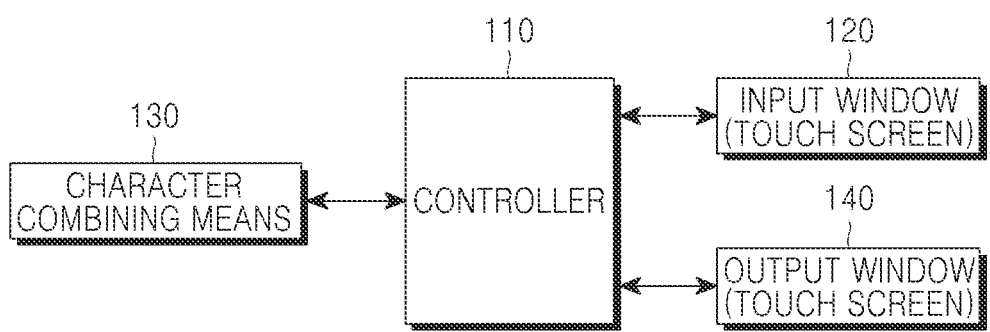
FIG. 1 is a block diagram of a Korean character input apparatus according to an exemplary embodiment of the present invention.

FIG. 1 is a block diagram of a Korean character input apparatus according to an exemplary embodiment of the present invention.

Referring to FIG. 1, the Korean character input apparatus including a touch screen includes a controller 110, an input window 120 for inputting characters, a character combining means 130 for combining characters input through the touch screen 120 in a predetermined process, and an output window 140 for displaying the characters combined by the character combining means 130 under the control of the controller 110. The input window 120 and the output window 140 are provided in the touch screen.

In particular, the present invention relates to the Korean character input apparatus in which the input window 120 includes a consonant input key, and a "ㅣ" vowel input key provided to the right of the consonant input key and a "ㅡ" vowel input key provided under the consonant input key. Exemplary embodiments of the present invention can implement an actual structure of Korean, and can realize a syllable structure of Korean by a touch gesture with respect to a vowel input key without a separate touch of a consonant input key. Moreover, by disposing a vowel input key around a consonant input key rather than in a separate region, the space efficiency of a touch screen can be improved.

Figure 2:
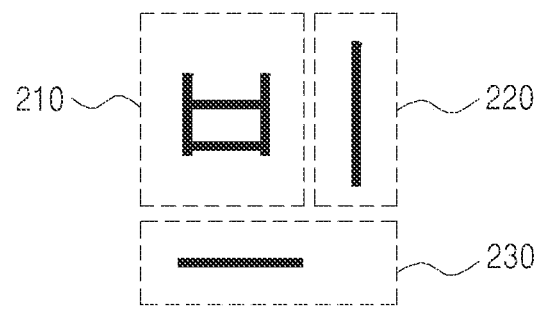
FIG. 2 is a diagram illustrating an input window of a Korean character input apparatus according to an exemplary embodiment of the present invention.

FIG. 2 is a diagram illustrating an input window of a Korean character input apparatus according to an exemplary embodiment of the present invention.

Referring to FIG. 2, the input window 120 of the Korean character input apparatus includes a consonant input key 210, and a "ㅣ" vowel input key 220 provided to the right of the consonant input key 210 and a "ㅡ" vowel input key 230 provided under the consonant input key 210. The vowel input keys 220 and 230 all correspond to the consonant input key 210. In other words, an exemplary embodiment of the present invention discloses a scheme in which, in case of a touch input with respect to one of the vowel input keys 220 and 230, a consonant input key corresponding thereto may be automatically selected, such that touch and selection of a consonant input key, especially corresponding to an initial consonant of a Korean syllable can be skipped.

FIGS. 3A to 3D are diagrams illustrating a Korean character input scheme using a Korean character input apparatus and method according to an exemplary embodiment of the present invention.

Figure 3A:
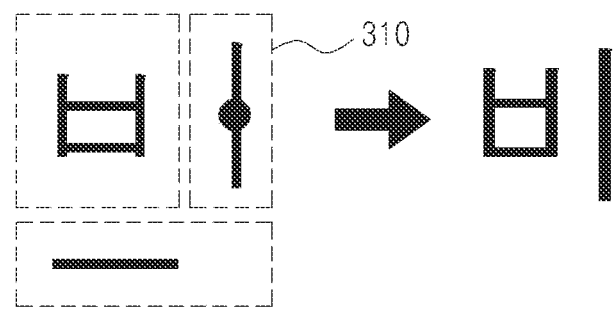
FIGS. 3A to 3E are diagrams illustrating a Korean character input scheme using a Korean character input apparatus and method according to an exemplary embodiment of the present invention.

Referring to FIG. 3A, when a user selects one of the "ㅣ" vowel input key 310 and the "ㅡ" vowel input key corresponding to and being subordinate to a "ㅂ" consonant input key, a consonant "ㅂ" may be automatically selected without a separate touch of the "ㅂ" consonant input key, and may be combined with the selected vowel. In FIG. 3A, the "ㅣ" vowel input key 310 is touched by the user, such that "ㅂㅣ" is displayed by a single touch.

As a more advanced scheme, an exemplary embodiment of the present invention also discloses a scheme for selecting a vowel according to a dragging gesture with respect to a vowel input key.

Figure 3B:
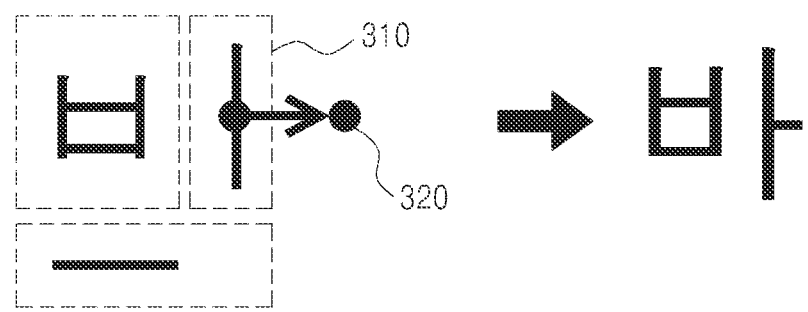

Referring to FIG. 3B, the user touches the "ㅣ" vowel input key 310 provided to the right of the consonant input key "ㅂ" and then makes a dragging gesture toward an area 320 of right side with respect to the "ㅣ" vowel input key 310 (as indicated by an arrow). In this case, the "ㅣ" vowel input key 310 and the dragging gesture (here, a dragging pattern corresponds to a dragging direction), such that a vowel "ㅏ" is determined. Consequently, the initially automatically selected consonant "ㅂ" and the vowel "ㅏ" are combined, and thus a Korean syllable "ㅂㅏ" is displayed and output.

Figure 3C:
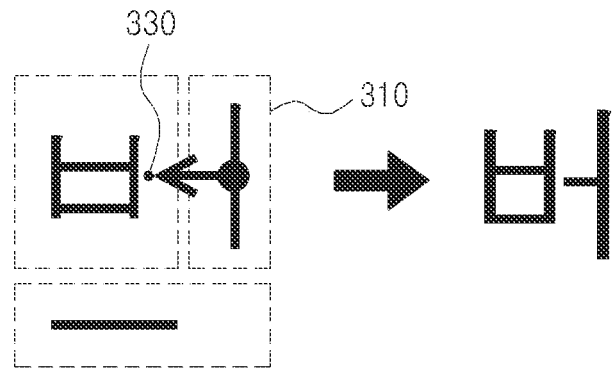

Referring to FIG. 3C, when the user touches the "ㅣ" vowel input key and then 310 makes a dragging gesture towards an area 330 of the consonant input key "ㅂ", a vowel "ㅣ" is selected, such that a Korean syllable "ㅂㅣ", which is a combination of "ㅂ" and "ㅓ", may be selected and displayed. However, according to an exemplary embodiment of the present invention, the user may also input "ㅂㅣ" by first touching the consonant input key "ㅂ", instead of touching the "ㅣ" vowel input key 310, and then making a dragging gesture to the right to the "ㅣ" vowel input key 310. Also in this case, a consonant may be determined by an initially touched vowel input key, but a consonant and a vowel may be selected and input at the same time.

That is, in an exemplary Korean character input scheme according to the present invention, a consonant may be selected by an input vowel, and a line generated and recognized by a dragging pattern, i.e., a dragging gesture, connected from the vowel (herein, the gesture line corresponds to a trace of the gesture and means a connecting line continuing between a dragging start touch point and a dragging end touch point) is combined with the vowel, thus determining a final input vowel.

The dragging gesture includes two points, a dragging start touch point and a dragging end touch point, and a connecting line therebetween, and thus the present invention discloses another exemplary embodiment in which a user touch gesture in the connecting line can be omitted in practice.

Figure 3D:
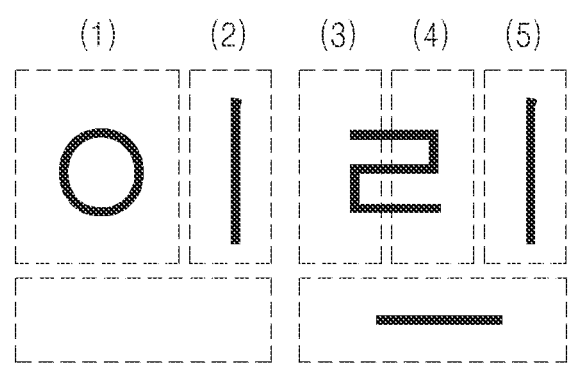

FIG. 3D is a diagram illustrating a. Korean character input scheme according to an exemplary embodiment of the present invention.

Referring to FIG. 3D, an input window structured similarly with the foregoing exemplary embodiment is provided, but two regions are set between a "ㅣ" vowel input key provided to the right of a consonant input key "ㅇ" and an adjacent "ㅣ" vowel input key. In other words, between the "ㅣ" vowel input key (region (2)) and the "ㅣ" vowel input key (region (5)) are displayed two separate regions (3) and (4). That is, in an exemplary embodiment, a vowel type is determined according to a region where the user, after touching a vowel input key, ends the touch, as will be described below.

If the user touches the region (2) and then a region (1), it is recognized as if a dragging gesture is made from the region (2) to the region (1), such that "ㅇㅣ" is input.

If the user touches the region (2) and the region (3) consecutively, "ㅇㅣ" is input; if the user touches the region (2) and the region (4), consecutively, the "ㅣ" vowel input key is combined with the adjacent "ㅣ" vowel input key such that "ㅖ" is input. Herein, the order of touches may be reversed.

Figure 3E:
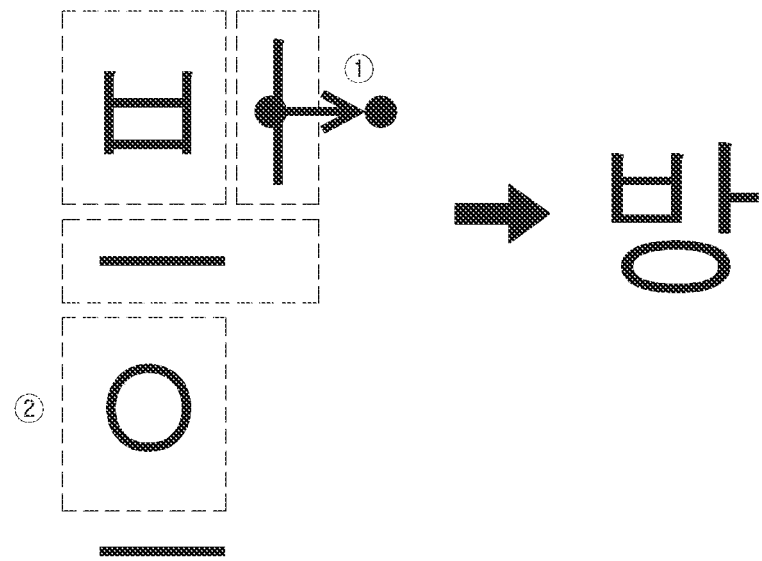

Exemplary embodiments of the present invention also disclose a scheme in which, when another consonant is selected after selection of the vowel, the selected consonant is selected and combined as a final consonant of a corresponding Korean syllable (refer to FIG. 3E). That is, in an exemplary embodiment of the present invention, since a vowel input key is first input to input another Korean syllable, then if after input of the vowel input key, a consonant input key, instead of another vowel input key, is input, a consonant corresponding to the input consonant input key is used as a final consonant of the Korean syllable.

FIG. 3E is a diagram illustrating a scheme for inputting a Korean syllable including a final consonant according to an exemplary embodiment of the present invention.

Referring to FIG. 3E, the user first touches the "ㅣ" vowel input key provided to the left of the consonant input key "ㅂ" and then makes a dragging gesture to the right as indicated by (1). Thus, with a single touch and a single dragging gesture, "ㅂ" and "ㅏ" are selected and combined with each other. Thereafter, the user touches another consonant input key "ㅇ" as indicated by (2), such that a Korean syllable "방" which uses "ㅇ" as a final consonant is completed and input. In other words, an exemplary embodiment of the present invention can input a Korean syllable including an initial consonant, a medial vowel, and a final consonant merely with two touches.

Another exemplary embodiment of the present invention relates to a scheme for selecting and inputting a compound vowel, that is, "ㅑ", "ㅕ", "ㅠ", or "ㅛ", by multi-touches and a dragging gesture therefrom, rather than a single touch and a dragging gesture therefrom.

Figure 4:
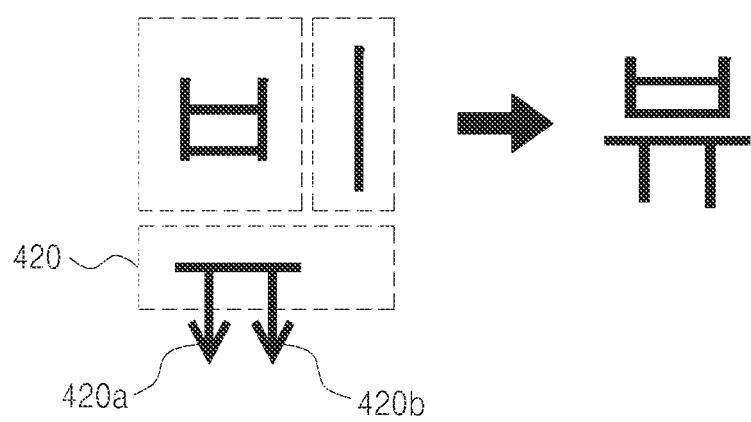
FIG. 4 is a diagram illustrating an example for inputting "ㅠ" according to an exemplary embodiment of embodiment of the present invention.

FIG. 4 is a diagram illustrating an example for inputting "ㅕ" according to an exemplary embodiment of the present invention.

Referring to FIG. 4, the user touches a "ㅡ" vowel input key 420 provided under "ㅂ", such that "ㅂ" is automatically selected as an initial consonant. Thereafter, the user makes a dragging gesture downward while keeping the touch. At this time, the dragging gesture is a multi-touch dragging gesture (that is, the dragging gesture is made while keeping the touch of two points as indicated by 420A and 420B), rather than a single-touch dragging gesture. Thus, a compound vowel "ㅕ", rather than a pure vowel "ㅓ", is selected.

An exemplary embodiment of the present invention may also provide a scheme for effectively inputting a compound vowel in which two vowels "ㅣ" are connected and used, for example, "ㅐ" or "ㅔ".

FIGS. 5A to 5D are diagrams showing examples and an input window according to an exemplary embodiment of the present invention.

Figure 5A:
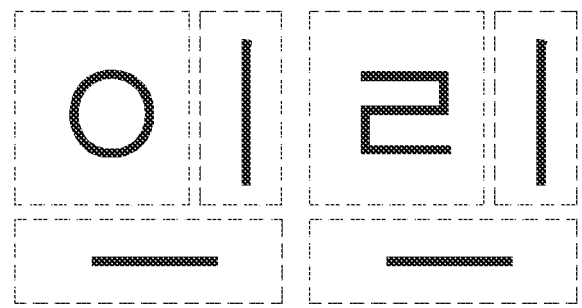
FIGS. 5A to 5D are diagrams showing examples for inputting syllables "에" and "애" according to an exemplary embodiment of the present invention.
Figure 5B:
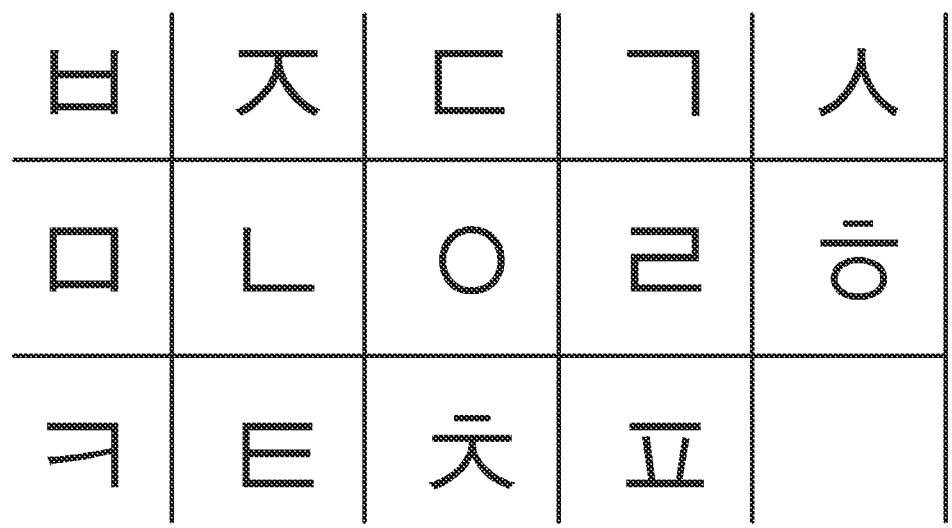

Referring to FIG. 5A, an input window according to the present invention includes a plurality of consonant input keys, around each of which are disposed a plurality of vowel input keys described with reference to FIG. 2. In particular, in an exemplary embodiment of the present invention, the plurality of vowel input keys are connected with each other to form a so-called grid structure as shown in FIG. 5B. However, in spite of the grid structure where the vowel input keys are connected with each other, the vowel input keys are connected to each of the consonant input keys and thus the grid structure has an input pattern distinctive to each consonant input key region.

Figure 5C:
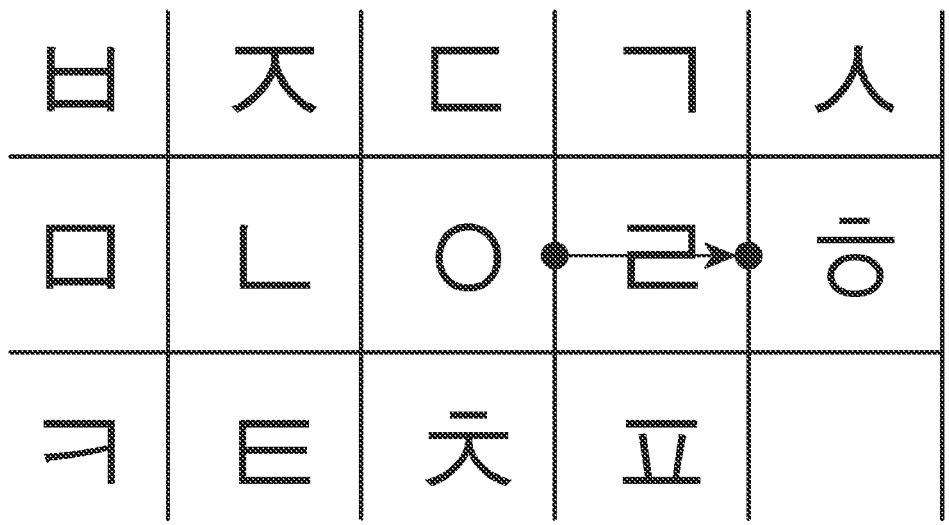

FIG. 5C illustrates an example where a "ㅣ" vowel input key corresponding to a consonant input key "ㅇ" input and a dragging gesture is made to another "ㅣ" vowel input key provided to the right of another consonant input key "ㄹ". That is, "ㅇ" is automatically selected by selection of an initial vowel input key, and "ㅐ" is selected by selection of "ㅣ", the single-touch dragging gesture therefrom, and combination with another "ㅣ". Thus, a Korean syllable "애" is combined and completed.

Figure 5D:
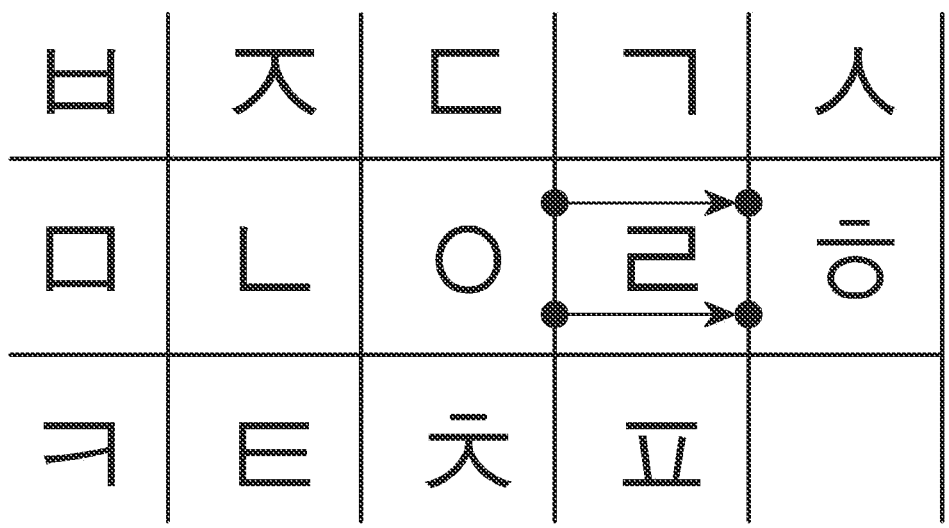

FIG. 5D illustrates an example where a "ㅣ" vowel input key corresponding to a consonant input key "ㅇ" is input and the multi-touch dragging gesture is made to another "ㅣ" vowel input key provided to the right of another consonant input key "ㄹ". That is, "ㅇ" automatically selected by selection of an initial vowel input key, and "ㅒ" is selected by selection of "ㅣ", the multi-touch dragging gesture therefrom, and combination with another "ㅣ". Thus, a Korean syllable "얘" is combined and completed.

Figure 6:
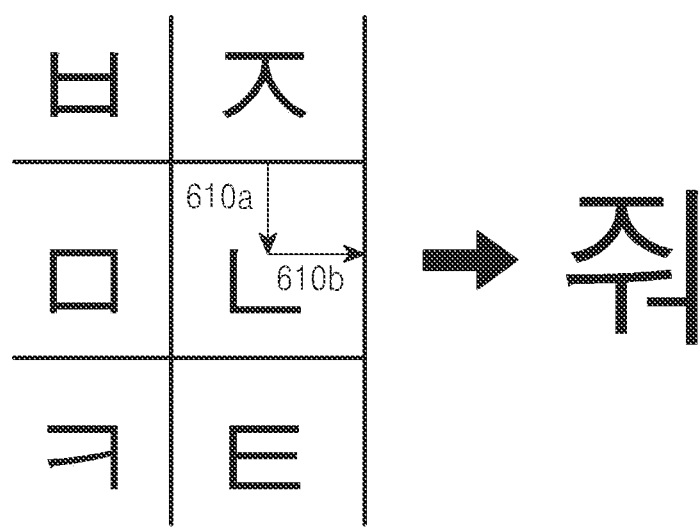
FIG. 6 is a diagram illustrating a scheme for inputting a Korean syllable including a complex vowel according to an exemplary embodiment of the present invention.

FIG. 6 is a diagram illustrating a scheme for inputting a Korean syllable including a complex vowel according to an exemplary embodiment of the present invention.

Referring to FIG. 6, the user touches a "ㅡ" vowel input key provided under a consonant input key "ㅈ", and makes a dragging gesture 610a downward, that is, down to a region of a consonant input key "ㄴ" and then a dragging gesture 610b to the right continuously from the dragging gesture 610a, to touch another "ㅣ" vowel input key. Thus, a compound vowel "ㅟ" which is a combination of "ㅜ" and "ㅣ" is selected as a vowel and is combined with the initially selected consonant "ㅈ", such that a Korean syllable "쥐" is input.

As such, in a Korean character input apparatus and method according to an exemplary embodiment of the present invention, by a touch-based selection of a vowel input key, a consonant (i.e., an initial consonant of a Korean syllable) corresponding to the vowel input key may be automatically selected and a vowel type of the Korean syllable is determined according to a dragging gesture from the touch. In other words, if there is no dragging gesture made from the touch, a vowel corresponding to the touched vowel input key is determined as a vowel; if there is a dragging gesture from the touch, a complex vowel is determined by the vowel input key and a dragging pattern. If another vowel input key (second vowel input key) is touched by the dragging gesture, a complex vowel is determined by the first selected vowel input key, the dragging pattern, and the second vowel input key, as described above with reference to FIG. 6.

An exemplary embodiment of the present invention also provides a scheme for effectively inputting a compound vowel where two or more "ㅣ" or "ㅡ" are shown in a Korean syllable, but they are not connected with each other, for example, "ㅔ" or "ㅢ". To input, for example, "예", the "ㅣ" vowel input key provided to the right of the consonant input key "ㅇ" may be selected and then a dragging gesture may be made to the left to select "ㅓ". In this state, however, another vowel "ㅣ" is difficult to add. To solve this problem an exemplary embodiment of the present invention proposes independent "ㅣ" and "ㅡ" vowel input keys which are not associated with a consonant input key, that is, their inputs do not cause selection of the consonant input key.

By using the independent "ㅣ" and "ㅡ" vowel input keys, a complex compound may be input. For example, to input the Korean syllable "쥐" shown in FIG. 6, the "ㅡ" vowel input key provided under the consonant input key "ㅈ" is touched and a dragging gesture is made downward, such that a Korean syllable "주" is input. In this state, by inputting the independent "ㅣ" vowel input key and making a dragging gesture to the left or from the left side with respect to the "ㅣ" vowel input key to the "ㅣ" vowel input key, a vowel "ㅓ" is combined with "ㅜ", such that the Korean syllable "ㅝ" is completed.

Figure 7:
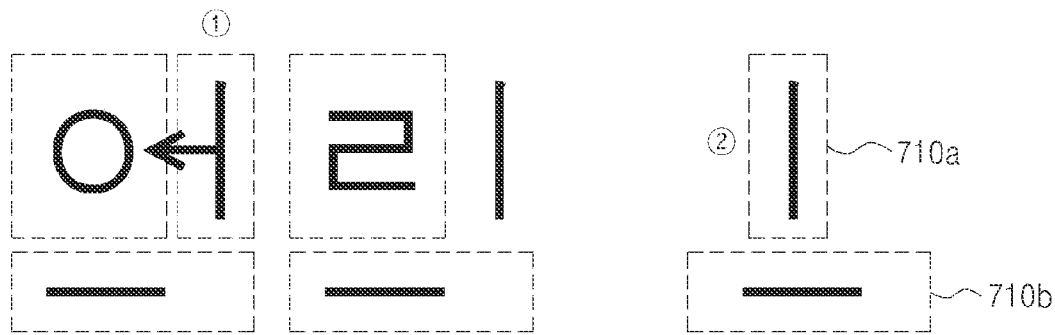
FIG. 7 is a diagram illustrating a Korean character input scheme according to an exemplary embodiment of the present invention.

FIG. 7 is a diagram illustrating a Korean character input scheme according to an exemplary embodiment of the present invention.

Referring to FIG. 7, an input window according to an exemplary embodiment includes independent "ㅣ" and "＿" vowel input keys 710a and 710b in addition to consonant input keys and a plurality of "ㅣ" and "＿" vowel input keys corresponding to each of the consonant input keys. For example, to input "에", the user selects the "ㅣ" vowel input key provided to the right of "ㅇ" and makes a dragging gesture to the left as indicated by (1). The user then touches the independent "ㅣ" vowel input key 710a as indicated by (2) to combine "ㅣ" with "ㅓ", such that a complex compound "ㅔ" is input. To input "의" in this way, the user selects the "ㅣ" vowel input key provided to the right of "ㅇ" or the "＿" vowel input key provided under "ㅇ" and selects the independent "ㅣ" vowel input key or the independent "＿" vowel input key, thereby completing "의".

By using the independent "ㅣ" and "＿" vowel input keys, emoticon expressions using vowels, such as "ㅠㅠ" and "ㄱㄱ" are possible.

Figure 8:
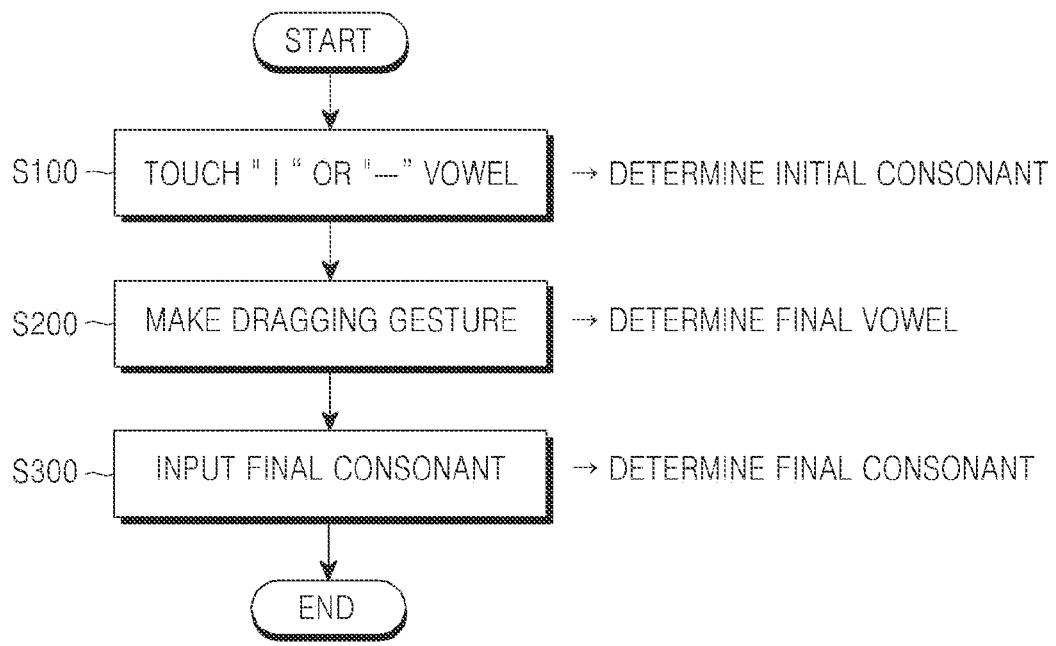
FIG. 8 is a flowchart illustrating a Korean character input method according to an exemplary embodiment of the present invention.

FIG. 8 is a flowchart illustrating a Korean character input method according to an exemplary embodiment of the present invention.

Referring to FIG. 8, a Korean character input method according to an exemplary embodiment of the present invention includes step S100 of touching a "ㅣ" vowel input key provided to the right of a consonant input key or a "＿" vowel input key provided under the consonant input key to automatically select a consonant corresponding to the consonant input key, especially an initial consonant; and step S200 of determining a final vowel according to a dragging gesture from the selected vowel input key. Another exemplary embodiment of the present invention discloses a Korean character input method further including step S300 of inputting a final consonant after step S200, as shown in FIG. 3D. Automatic selection of a consonant according to the input of a vowel and a combination of the consonant and the vowel have already been described and thus will not be described in detail.

The Korean character input apparatus and method according to exemplary embodiments of the present invention can be applied to a touch screen of any touch screen-based electronic device such as a portable terminal, a PMP, a notebook, and so forth.

According to exemplary embodiments of the present invention, the number of character input keys disposed on a touch screen used in a mobile device can be minimized, and Korean characters can be composed by a minimum touch action, thereby simplifying a Korean character input action and thus reducing the time required for inputting Korean characters and effectively using a limited touch screen region.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. An electronic apparatus for inputting a character in a touch screen, the electronic apparatus comprising:
   the touch screen configured to:
      display an input window comprising a plurality of consonant input keys and two vowel input keys corresponding to each of the plurality of consonant input keys, the two vowel input keys being presented around each of the plurality of consonant input keys without touching each of the plurality of consonant input keys, and
      sense a touch gesture starting from one of the two vowel keys corresponding to each of the plurality of consonant input keys; and
   a controller configured to:
      determine an initial consonant according to a selection of one of the two vowel input keys in the input window, by the touch gesture with respect to the one of the two vowel input keys without a touch of the plurality of consonant input keys, and
      combine the initial consonant with a medial vowel corresponding to the selected one of the two vowel input keys,
   wherein the touch screen is configured to display a character according to the combination of the initial consonant and the medial vowel.

2. The electronic apparatus of claim 1, wherein the two vowel input keys comprise a "ㅣ" vowel input key provided to a right side of each of the consonant input key, and a "＿" vowel input key provided under each of the consonant input key.

3. The electronic apparatus of claim 2, wherein the "ㅣ" vowel input key and the "＿" vowel input key are connected with each other to form a grid structure.

4. The electronic apparatus of claim 1, wherein if a certain consonant input key is selected after the one of the two vowel input keys is selected, the controller is configured to determine the certain consonant input key as a final consonant of the character, and to combine the character by using the determined initial consonant, the medial vowel corresponding to the selected one of the two vowel input keys, and the final consonant.

5. The electronic apparatus of claim 1, wherein the medial vowel according to the selected one of the two vowel input keys is determined by a touch of the one of the two vowel input keys or a dragging gesture continuing from the touch.

6. The electronic apparatus of claim 1, wherein the medial vowel according to the selected one of the two vowel input keys is determined according to a region where a touch of the one of the two vowel input keys occurs or a region in which a dragging gesture continuing from the touch is stopped.

7. The electronic apparatus of claim 1, wherein the controller is configured to combine the character by using a vowel corresponding to the one of the two vowel input keys if there is no dragging gesture made from the touch of the one of the two vowel input keys, and to combine the character by using a combination of the vowel corresponding to the one of the two vowel input keys and a dragging pattern of a dragging gesture if there is a dragging gesture from the touch of the one of the two vowel input keys.

8. The electronic apparatus of claim 1, wherein, if a dragging gesture made from the touch of the one of the two vowel input keys extends to another vowel input key, the controller is configured to combine the character by using a combination of a vowel corresponding to the one of the two vowel input keys, a dragging pattern of the dragging gesture, and a vowel corresponding to the other vowel input key.

9. The electronic apparatus of claim 1, wherein the medial vowel includes pure-vowels and compound-vowels, wherein the pure-vowel is selected through a single-touch dragging gesture, and wherein the compound-vowel is selected through a multi-touch dragging gesture.

10. The electronic apparatus of claim 9, wherein the pure vowels include "ㅏ", "ㅓ", "ㅗ" or "ㅜ", and, the compound vowels include "ㅑ", "ㅕ", "ㅛ", or "ㅠ".

11. A touch-screen based electronic device comprising the apparatus according to claim 1.

12. A method for inputting a character in a touch screen, the method comprising:
   detecting a selection of one of two vowel input keys in a touch screen displaying an input window comprising a plurality of consonant input keys and the two vowel input keys corresponding to each of the plurality of consonant input keys, the two vowel input keys being presented around each of the plurality of consonant input keys without touching each of the plurality of consonant input keys and sensing a touch gesture starting from one of the two vowel keys corresponding to each of the plurality of consonant keys;
   determining an initial consonant according to a selection of one of the two vowel input keys in the input window, by the touch gesture with respect to the one of the two vowel input keys without a touch of the plurality of consonant input keys;
   combining the initial consonant with a medial vowel corresponding to the selected one of the two vowel input keys; and
   displaying a character according to the combination of the initial consonant and the medial vowel.

13. The method of claim 12, wherein the two vowel input keys comprise a "ㅣ" vowel input key provided to a right side of each of the consonant input key, and a "ㅡ" vowel input key provided under each of the consonant input key.

14. The method of claim 13, wherein the "ㅣ" vowel input key and the "ㅡ" vowel input key are connected with each other to form a grid structure.

15. The method of claim 12, further comprising:
   if a certain consonant input key is selected after the one of the two vowel input keys is selected, determining the selected certain consonant input key as a final consonant of the character, and combining the character by using the determined initial consonant, the medial vowel corresponding to the selected one of the two vowel input keys, and the final consonant.

16. The method of claim 12, wherein the medial vowel according to the selected one of the two vowel input keys is determined by a touch of the one of the two vowel input keys or a dragging gesture continuing from the touch.

17. The method of claim 12, wherein the medial vowel according to the selected one of the two vowel input keys is determined according to a region where a touch of the one of the two vowel input keys or a region in which a dragging gesture continuing from the touch is stopped.

18. The method of claim 12, further comprising:
   combining the character by using a vowel corresponding to the one of the two vowel input keys if there is no dragging gesture made from the touch of the one of the two vowel input keys; and
   combining the character by using a combination of the vowel corresponding to the one of the two vowel input keys and a dragging pattern of a dragging gesture if there is a dragging gesture from the touch of the one of the two vowel input keys.

19. The method of claim 12, wherein, if a dragging gesture made from the touch of the one of the two vowel input keys extends to another vowel input key, combining the character by using a combination of a vowel corresponding to the one of the two vowel input keys, a dragging pattern of the dragging gesture, and a vowel corresponding to the other vowel input key.

20. The method of claim 12, wherein the medial vowel includes pure-vowels and compound-vowels, wherein the pure-vowel is selected through a single-touch dragging gesture, and wherein the compound-vowel is selected through a multi-touch dragging gesture.

21. The method of claim 20, wherein the pure vowels include "ㅏ", "ㅓ", "ㅗ", or "ㅜ", and, the compound vowels include "ㅑ", "ㅕ", "ㅛ", or "ㅠ".

22. At least one non-transitory processor readable medium for storing a computer program of instructions configured to be readable by at least one processor for instructing the at least one processor to execute a computer process for performing the method as recited in claim 12.

* * * * *